3,464,834
FREEZE-DRYING ICE MILK CONFECTIONS
Maurie Laskin, Milwaukee, Wis., assignor to W. R. Grace & Co., New York, N.Y., a corporation of Connecticut
No Drawing. Continuation-in-part of application Ser. No. 324,240, Nov. 18, 1963. This application June 17, 1965, Ser. No. 464,832
Int. Cl. A23g 5/00
U.S. Cl. 99—199                                     8 Claims

ABSTRACT OF THE DISCLOSURE

Freeze-dried, rehydratable, frozen ice milk confections, such as ice cream, in which the cellular character of the originally frozen confection is preserved in the dehydrated product; articles of manufacture comprising monolithic forms of these dehydrated products coated with an edible, moisture-protective coating, especially candy articles in which the edible coating is a candy coating such as chlocolate and/or caramel; and a method for preparing these dehydrated products comprising first cooling a monolithic form of the already frozen ice milk confection to a hard-frozen solid and then dehydrating by heating under a reduced pressure of less than about 1.5 millimeters of mercury (absolute) while maintaining the rate of heating so as to maintain the hard-frozen solid portion of the monolithic form essentially in the hard-frozen solid state until completion of the dehydration.

---

This application is a continuation-in-part of United States patent application Ser. No. 324,240, filed Nov. 18, 1963, and now abandoned.

This invention relates to dried frozen ice milk confections and more particularly to a freeze-dried, storage stable frozen ice milk and cream confection products that may be used as a confection per se or as the center piece of a candy-coated confection product, or may be rehydrated to form the original frozen milk and cream confection by the mere addition of water and freezing. This invention also relates to improved methods of freeze-drying especially applied to frozen ice milk and cream confection products.

It is well understood that freeze-drying techniques rely on the principal of sublimation of ice crystals and diffusion of the resulting water vapors through and out of the product. The heat of sublimation in freeze-drying processes is provided by radiation from platens or similar heat exchangers located proximate to the frozen material. Excessive heat, insufficient vacuum, or direct contact of the frozen material with the heat exchanger, results in thawing or conversion of the ice to water, followed by ordinary dehydration and evaporation. This causes collapse or alternation of the cell or other physical structure of the product being dried, which of course is undesirable. In the case of frozen ice milk and cream confections, the texture and quality of the product are in large part due to the emulsified stablized character of the butterfat in the product. Thawing and dehydration of the product results in breaking of the butterfat emulsion and separation of the various components which are not restored to their original state with any reasonable degree of effort.

While frozen ice milk confections [which term, for the purposes of the present invention, includes ice cream mixes, ice cream products, ice milks, soft ices, high fat ices, sherbets, frozen custards and the like (including synthetic ice cream, etc.)] have been commercially manufactured for many years, the storage and shipment of these products has necessitated the use of expensive refrigeration equipment. This expense has limited distribution from commercial plants essentially to a local area. According to the present invention it has been found that it is possible to freeze-dry frozen ice milk confections to produce a product of low moisture content which in comminuted form is readily rehydratable to a product resembling the original in taste and texture. It has also been found that by the present invention it is possible to dehydrate the frozen ice milk confections to a dry product which has utility as a confection per se or as a component of a confectionery food product.

Accordingly, in one broad form, the present invention is a method of producing a dehydrated initially frozen ice milk confection which comprises cooling a frozen ice milk confection in a monolithic form to a solid frozen monolith, dehydrating said frozen monolith by heating under reduced pressure, the rate of said heating being such as to prevent thawing and concomitant foaming of the monolith until the dehydration is essentially complete.

In another broad form the present invention comprises a rehydratable, dehydrated frozen ice milk confection, wherein the cellular emulsified character of the originally frozen product is preserved in dehydrated monolithic form and which dehydrated monolith is restorable to its original properties of texture and taste by rehydration and freezing.

The initial cooling or freezing step should be carried out under atmospheric pressure to avoid foaming of the frozen product. While it is conventional to use evaporative cooling, i.e., the application of vacuum to reduce the temperature of the product, such a technique is not feasible in the treatment of a frozen ice milk confection unless it is already in the solid, unsoftened, or unthawed frozen state. It has been found that thawing of ice cream or similar materials, while under vacuum, results in foaming to such an extent that large volumes are generated. In conventional freeze-drying apparatus the product to be dehydrated is placed on a plurality of trays usually of screen-like or open and reticulated construction. The trays containing the product are stacked in a spaced series within the vacuum chamber. A plurality of heat exchangers are disposed in substantially opposed relation between and spaced from the trays. The spacing and construction of the heat exchangers is such as to provide transfer of radiant heat energy over a relatively short path to the product being dried. In a highly evacuated system the percentage of heat transfer by conduction or convection is minimized.

The foaming under vacuum of softened frozen milk confections, particularly at a thawed surface in such conventional freeze-drying apparatus, will result in direct contact of the foam with the adjacent heating surface, and the process must be terminated.

Accordingly, it is desirable and necessary that prior to the introduction of the frozen milk confection into the vacuum chamber of the freeze-drying apparatus it should be cooled to the point where it is solidly frozen, particularly in having a hard frozen surface which, in handling and forming, is not predisposed to melt, thaw or soften. In this connection a temperature of —10° Fahrenheit or preferably —20° Fahrenheit or below is required, although the melt or thaw point of the particular product is variable, depending upon the formulation, i.e., various amounts of sugar, flavorants, etc. It should be understood however that once the product has been cooled to the desired point, i.e., where the entire monolith including all surfaces, is frozen hard, evaporative cooling may be and is used to maintain the temperature of the undehydrated frozen portions in an unthawed state during the dehydration step.

The dehydration process is carried out under low pressures, i.e., below the vapor pressure of ice at the particular temperature of the product undergoing dehydration. Preferably the pressure should be below and 1.5 millimeter of mercury, and in the most preferred embodiments of this process, below about 1.0 millimeter of mercury (absolute). It should be further understood that the pressures referred to herein, unless otherwise indicated, are absolute pressures.

The product is heated during the dehydration step of this process by means of radiant energy which is emanated from the surface of the heat exchanger platen or surface. In the initial stages of the process, while the vacuum level is being established, little or no heat may be required, particularly if the product temperature equilibrium is being established by sublimation cooling under vacuum. When heating from outside sources is required to maintain the dehydration at an economically feasible rate, it is provided by the heat exchangers. These may be operated over a broad range of temperatures and are adjusted to provide sufficient heat to maintain sublimation or dehydration at a maximum, but not so high in temperature to cause melting or thawing of the product. Preferably higher temperatures should be used in the initial stages of the dehydration and are slowly decreased in stepwise fashion as drying progresses. A broad range of heat exchanger or platen temperatures that can be employed is from about 250° Fahrenheit to about 90° Fahrenheit, and preferably between about 160° Fahrenheit and 90° Fahrenheit. The product temperature, at least with respect to the frozen undehydrated portion, should be maintained at a point where no substantial thawing takes place, e.g., about −10° Fahrenheit or less during the drying step.

The time of the process is variable but ordinarily the freeze-drying can be carried out over a period of from about one to twenty hours. In the freeze-drying dehydration method of the present invention the frozen ice milk confection product should be cut or otherwise formed into monolithic slabs, pieces, or sheets—preferably less than one inch thick, and in the most preferred instance about one-half inch or less in thickness. Ordinarily the thinner slabs permit the more rapid diffusion of vapor from the core of frozen material being dehydrated, as well as presenting a broader sublimation interface. The frozen ice milk confections of the present invention are dried to a low moisture content, preferably less than 4 percent moisture (weight basis) and in the most preferred embodiment less than 1½ percent moisture.

As previously pointed out the products of the process of the present invention are dehydrated ice milk confections which, as contemplated herein, include ice milks, soft ice, high fat ices, ice cream and ice cream mixes, sherberts, frozen custards and the like (including synthetic ice cream, ice milk, etc.). These ice milk confections and methods for their manufacture are, in general, known to the art. Federal and State Standards on the composition of ice milk confections are set forth in Agriculture Handbook No. 51, U.S. Department of Agriculture Agricultural Marketing Service, Washington, D.C. (Revised 1962) (particularly at pages 10, 11, 12, 20, 21, 22, 23, 24 and 25) the disclosure of which is incorporated by reference herein. The synthetic ice creams and ice milks referred to hereinabove are the products identified as "Frozen dessert-mellorine type" and "Low fat frozen dessert-mellorine type" in the said Agriculture Handbook No. 51. Essentially these are ice cream-like products prepared with animal or vegetable fats rather than milk fats (e.g., butterfat).

Typical formulations of the ice milk confections contemplated by the present invention can be found, for example, in "The Chemical Formulary" edited by H. Bennett and published by the Chemical Publishing Co., Inc., New York, N.Y., as follows: volume I (1933): pages 58, 59, 60; volume II (1935): pages 222 through 229, inclusive; volume III (1936): pages 134 through 145, inclusive; volume IV (1939): pages 124, 125, 126; volume V (1941): pages 121, 122; volume VII (1945): pages 178, 179, 180; volume VIII (1948): pages 183 through 186, inclusive; volume IX (1951): pages 223 through 226, inclusive; and volume X (1957): pages 170, 171. These typical formulations are also incorporated herein by reference thereto.

The method as discussed herein produces a monolithic unit which can be used per se as a confection or may be used as a component thereof, such as for example a candy bar or piece filler, which is coated with chocolate or the like. It may also be comminuted or ground to a finely divided material which can be packaged in bags or boxes for shipment or storage. The product in a powdered state can also be rehydrated by simple mixing with water and/or milk, and freezing to produce a product comparable with the original in texture and flavor. It should be understood that for best preservation the dehydrated frozen ice milk confections of the present invention are stored in such a manner as to exclude atmospheric moisture, such as in hermetically sealed cans under nitrogen pack or laminated moisture-proof bags.

The following examples will illustrate the carrying out of the process of the present invention:

EXAMPLE 1

Vanilla ice cream of 10 percent butterfat content was cut into monolithic slabs of one-half inch in thickness. The slabs were preliminarily cooled at atmospheric pressure to −5° Fahrenheit. The product was then placed in a freeze-drier chamber [Freeze-Dry Pilot—Model UPFD–X, Vacudyne Corp.] and subjected to a vacuum [pressure 0.41 millimeter mercury (absolute)] for a period of one hour and fifteen minutes. During this time the product temperature dropped to about −22° to −25° Fahrenheit due to sublimation cooling. The heat in the drier platens was applied according to the following schedule of chamber pressure, platen temperature and time for each sequence.

| Platen temperature, degrees Fahrenheit | Pressure, millimeters of mercury (absolute) | Time |
|---|---|---|
| 150 | 0.68 | 50 minutes. |
| 125 | 0.49 | 30 minutes. |
| 100 | 0.45–0.5 | 15 hours 40 minutes. |
| | | Product removed. |

The product was removed from the freeze-drier after a total treatment time of 18 hours 15 minutes as a monolithic slab of about 1 percent moisture content. The product is readily stored in hermetically sealed, moisture-proof containers without refrigeration.

Pieces of the slab were coated with chocolate to make a candy bar or piece type of confection. Other sections of the dried slab were cut into small pieces, coated with caramel and then with a layer of chocolate. It should be understood that the candy coating of chocolate and/or caramel acts as a moisture vapor barrier surrounding the candy piece core.

A portion of the slab was ground to a fine powder and stored in containers for a period of twelve weeks. At the end of this time the product in the comminuted state was mixed with water in the ratio of two parts by weight freeze-dried product to three parts by weight of water, and the mixture placed in trays and frozen. When solidified the material had essentially the smooth texture, taste, body and fine quality of the original ice cream.

EXAMPLE 2

A frozen ice milk confection, known popularly as a frozen custard, having a butterfat content of about 4½ percent, was treated by the procedure of Example 1. The product in slabs about ½ inch thick was initially frozen solid to a temperature of about −25° Fahrenheit at atmospheric pressure. It was then placed in the trays of the freeze-drying apparatus chamber and the pressure was reduced to about 0.12 millimeter of mercury (absolute) over a forty minute period. During this period the product temperature dropped to about −33° Fahrenheit due to sublimative cooling. Heat was then applied to the drier platens according to the following schedule of platen temperature, pressure and time for each sequence:

| Platen temperature, degrees Fahrenheit | Pressure, millimeters of mercury (absolute) | Time |
|---|---|---|
| 150 | 0.19 | 25 minutes. |
| 125 | 0.19 | 30 minutes. |
| 100 | 0.15–0.09 | 18 hours 10 minutes. |
| | | Product removed. |

The product was removed from the freeze-drier after a total time of nineteen hours and forty-five minutes. The product had a moisture content of less than about 1 percent. It will be noted that the last drying sequence was somewhat longer than Example 1 due to operation over night, but it should be understood that the drying is essentially complete in a shorter time. The product was comminuted, mixed with water in a ratio of about two parts product and three parts water, and poured into freezing trays. The frozen product had the texture, body, flavor and quality of the original frozen ice milk material.

EXAMPLE 3

A frozen ice milk confection, popularly known as pineapple sherbert was obtained on the open market from the local branch of a well known nationwide chain grocery store and was cut into monolithic slabs about 1½ x 2 inches by ⅜ inch thick, and treated by the procedure of Example 1. The slabs were initially frozen solid to a temperature of about −40° Fahrenheit at atmospheric pressure. These slabs were placed in the trays of the freeze-drying apparatus chamber and the pressure was reduced to less than one millimeter of mercury (absolute) over a period of 13 minutes. The product temperature dropped to about −45° to −50° Fahrenheit. Heat was then applied according to the following schedule of platen temperature, pressure and times:

| Platen temperature, degrees Fahrenheit | Pressure, millimeters of mercury (absolute) | Time |
|---|---|---|
| 150 | <0.5 | 37 minutes. |
| 125 | <0.5 | 2 hours 7 minutes. |
| 175 | <0.5 | 2 hours. |
| Heaters turned off | <0.5 | 18 minutes. |
| Total | | 5 hours 15 minutes. |
| | | Product removed. |

Due to the relatively shortened freeze-drying cycle time not all of the slabs had dried to the desired degree. Several of the slabs had dried to a moisture content of less than about 1 percent in the time allowed. These had a good, crisp body and excellent taste, with a good sharp characteristic flavor. They were judged to be eminently suited for use as rehydratable sherbet or as fruit flavored centers in candy enrobed with chocolate or other candy coating.

EXAMPLE 4

A frozen ice milk confection of the mellorine type was prepared using the following formulation:

Imitation ice cream formulation

Ingredient:

| | |
|---|---|
| Corn oil parts by weight | 1100 |
| Powdered skim do | 1337 |
| Cane sugar do | 1100 |
| Powdered corn syrup sugars (Frodex) do | 660 |
| Stabilizer do | 33 |
| Water do | 6770 |
| Flavor (vanilla) ounces | 4 |

All ingredients (except flavorant) were mixed and pasteurized at 160°–180° Fahrenheit for 30 minutes, homogenized at 1000–2000 pounds per square inch, cooled and stored for later usage. Flavorant is blended in prior to treatment.

This product was treated using the general procedure of the preceding examples. Slabs about ⅜-inch thick were initially frozen solid to a temperature of about −40° Fahrenheit at atmospheric temperature. These were placed in the freeze-drying apparatus chamber and the pressure was reduced to about 0.25 millimeter of mercury (absolute) over a 7 minute period. During this period the temperature of the product had dropped to about −50° Fahrenheit. Heat was then applied to the dried platens according to the following platen temperature and time sequence while maintaining the chamber pressure at about 0.25 millimeter of mercury (absolute) or lower.

Platen temperature, degrees Fahrenheit: Time
150 _____ 5 hours 37 minutes.

After the indicated drying time the product had a moisture content of less than one percent. It was suited for use as a rehydratable synethetic ice cream or as a candy center piece, similarly as the other ice milk confections of this invention.

While the foregoing specific examples illustrate the process of the present invention in the production of specific dehydrated frozen ice milk confections, it will of course be understood that they may be applied to a variety of similar materials. Frozen ice milk confections, as previously indicated, include as that term is used herein a variety of materials known among other things as ice cream, ice cream mixes, ice milk, soft ices, high fat ices, sherbets, frozen custards and the like. Generally these products contain nonfat milk solids, sugar, or other sweeteners, gelatin or other stabilizers and butterfat (or equivalent fats). The butterfat (or other fat) content may vary from a very small percentage, i.e., 1 percent or 2 percent, to quite high in rich ice cream or synthetic ice cream products. Other additives, such as fruit, nuts (as indicated above), eggs, flavorants, etc. are conventionally added to the frozen ice milk confections. For example, ice cream containing fruit or nuts may be dehydrated by the process of the present invention to produce a fruit or nut-filled piece as a filler for candy or the like. The freeze-dried ice milk confections can also be used together with vanilla cookie wafers, macaroons and the like as the center piece for candies coated with chocolate or the like. In addition, it has been found that the process of the present invention may be applied to commercial ice cream mixes which have previously been frozen to a solid state, with the same excellent results.

The advantage of storability without refrigeration is of commercial significance, since the freeze-dried, frozen ice milk confections may be readily shipped to distant points and rehydrated at the point of use at a considerably reduced expense, especially since the original ice cream or other frozen confection contains as much as about 60 percent by weight water in the form of ice crystals.

While several specific examples of the invention have been shown above, it will be understood, of course, that the invention is not to be limited thereto, since many modifications may be made, and it is contemplated, therefore, to cover any such modifications as fall within the true spirit and scope of this invention, as defined by the appended claims. Thus, for example, it will be apparent that coating materials other than candy coatings may be used to protect the freeze-dried ice milk confection from atmospheric moisture. Many edible coating materials which would serve such purpose are known to the art, e.g., gelatin, sodium carboxymethyl cellulose, methyl cellulose, hydroxy propyl methyl cellulose and the like. Products thus coated can be used, for example, as additives for dry cereals; as food for astronauts, etc.

I claim:
1. Method of dehydrating an initially frozen ice milk confection of cellular character which comprises first further cooling the already frozen milk confection in a monolithic form at atmospheric pressure thereby avoiding foaming to a temperature at which the monolithic form is a hard-frozen solid, and then dehydrating to a moisture content of less than about 4 percent by applying heat to the hard-frozen, solid monolithic form under a reduced pressure of less than about 1.5 millimeters of mercury (absolute), the rate of heat application being such as to maintain the solid frozen portion of the monolithic form in the solid frozen state until dehydration is complete, whereby the cellular character of the initially frozen ice milk confection is preserved in the dehydrated monolithic form.

2. Method of claim 1 wherein the hard-frozen, solid monolithic form is dehydrated to a moisture content of less than about 1½ percent.

3. Method of claim 2 wherein the pressure is maintained at less than about 1.0 mm. of mercury (absolute) during the dehydration step.

4. Method of claim 2 wherein the frozen ice milk confection is ice cream.

5. Method of claim 2 including the further step of comminuting the dehydrated product.

6. Method of claim 3 wherein the frozen cellular ice milk confection in said first further cooling step is brought to a temperature of below about −10° Fahrenheit.

7. Method of claim 5 wherein the frozen ice milk confection is ice cream.

8. Method of claim 6 wherein the temperature is below about −20° Fahrenheit.

References Cited

UNITED STATES PATENTS

| | | | |
|---|---|---|---|
| 1,127,114 | 2/1915 | Thompson | 99—138 |
| 2,726,959 | 12/1955 | Lushbough et al. | 99—138 |
| 2,885,788 | 5/1959 | Leviton | 99—199 |

OTHER REFERENCES

"What's Coming in Freeze Drying," Food Engineering, February 1963, pages 64–67.

A. LOUIS MONACELL, Primary Examiner

W. C. LAWTON, Assistant Examiner

U.S. Cl. X.R.

99—134, 136